United States Patent [19]

Shaffer

[11] 4,101,354

[45] Jul. 18, 1978

[54] COATING FOR FIBROUS CARBON MATERIAL IN BORON CONTAINING COMPOSITES

[75] Inventor: Robert C. Shaffer, Playa del Rey, Calif.

[73] Assignee: Hitco, Irvine, Calif.

[21] Appl. No.: 701,597

[22] Filed: Jul. 1, 1976

[51] Int. Cl.$^2$ ............................................. B32B 31/00
[52] U.S. Cl. ............................... 156/60; 156/245; 156/315; 264/29.5; 427/227; 427/228; 428/260; 428/284; 428/289; 428/290; 428/365; 428/408
[58] Field of Search .............. 428/245, 260, 408, 367, 428/284, 289, 290, 365; 156/243, 245, 60, 315; 264/29.5; 427/DIG. 11, 227, 228

[56] References Cited

U.S. PATENT DOCUMENTS

| | | | |
|---|---|---|---|
| 3,462,289 | 8/1969 | Rohl et al. | 428/408 |
| 3,672,936 | 6/1972 | Ehrenreich | 428/408 |
| 3,772,115 | 11/1973 | Carlson et al. | 264/29 |
| 3,779,851 | 12/1973 | Hertz | 156/161 |
| 3,914,508 | 10/1975 | Hooten et al. | 428/408 |
| 3,967,029 | 6/1976 | Veltri | 428/408 |

*Primary Examiner*—James J. Bell
*Attorney, Agent, or Firm*—Fraser and Bogucki

[57] ABSTRACT

Fibrous carbon material such as graphite cloth which is to be combined with a thermosetting resin and a boron containing compound to form a carbon-carbon composite is provided with a protective coating consisting of cured furfuryl alcohol copolymers. When formed into a laminate and heated to at least 2150° C. to carbonize and at least partially graphitize the thermosetting resin, the boron greatly increases the interlaminar tensile strength while the coating protects the fibrous material from adverse effects of the boron which reduce the tensile strength in the directions of the fibers of the fibrous carbon material of the composite.

13 Claims, No Drawings

COATING FOR FIBROUS CARBON MATERIAL IN BORON CONTAINING COMPOSITES

BACKGROUND OF THE INVENTION

1. Field of the Invention

The present invention relates to carbon-carbon composites, and more particularly to composites made from fibrous carbon material, a thermosetting resin and a boron containing compound.

2. History of the Prior Art

It is known to use boron in the manufacture of carbon material such as graphite made from a filler such as graphite powder and graphitizable material such as pitch or a resin. The boron enhances the combination of the materials and the conversion thereof into graphite.

It is also known in the art to use boron in the manufacture of carbon-carbon composites comprised of fibrous carbon material such as carbon or graphite cloth and a thermosetting resin. Examples of this type of composite are provided by U.S. Pat. No. 3,672,936, issued June 27, 1972 to Leo C. Ehrenreich. The Ehrenreich patent recognizes that there is some improvement in interlaminar tensile strength as well as in oxidation resistance when a boron containing compound is added to the resin impregnated fibrous carbon material prior to carbonization of the resin.

However, what the prior art has failed to recognize is that the interlaminar tensile strength of laminated carbon-carbon composites is greatly improved with use of boron, particularly amorphous boron, if the composite is heated to a temperature of at least about 2150° C. during carbonization and graphitization thereof. Thus, while the Ehrenreich patent suggests use of temperatures as high as 2800° C., the examples set forth therein use temperatures well below 2150° C. At temperatures below 2150° C. the voids formed within the resin during decomposition thereof fail to knit properly despite the presence of boron, leaving the finished composite with relatively low interlaminar tensile strength. The prior art has also failed to recognize that while interlaminar tensile strength may be greatly improved with temperatures at or in excess of about 2150° C., the tensile strength in the directions of the fibers of the fibrous carbon material is seriously degraded.

Accordingly, it would be desirable to provide carbon-carbon composites having greatly improved interlaminar tensile strength.

It would furthermore be desirable to provide carbon-carbon composites having both improved interlaminar tensile strength and substantial tensile strength in the directions of the fibers of the fibrous carbon material.

It would furthermore be desirable to be able to use boron and boron containing compounds in the presence of fibrous carbon materials at high temperatures without adverse effect on the fibrous materials.

BREIF DESCRIPTION OF THE INVENTION

The present invention is based upon an observation that the interlaminar tensile strength of carbon-carbon composites containing boron is greatly improved if the composite is heated to at least about 2150° C. during carbonization and graphitization and the further observation that at such temperatures the tensile strength in the directions of the fibers of the fibrous carbon material typically decreases substantially, apparently due to a deterioration of the fibrous carbon material of the composite caused by reaction with boron at the high temperatures. The present invention prevents significant decrease in the tensile strength in the directions of the fibers of the fibrous carbon material by use of a protective coating on the fibers. The protective coating comprises a thermosetting material which remains flexible after being subjected to curing temperatures. The coating is applied to the fibers and cured prior to addition of the resin and a boron containing compound. The resin and boron containing compound may then be added with the resin being at least partially cured. Upon formation of a laminate and heating of the laminate to a temperature sufficient to carbonize and at least partially graphitize the resin, the interlaminar tensile strength has been found to be greatly improved without significant decrease in the tensile strength in the directions of the fibers of the fibrous carbon material of the laminate.

DETAILED DESCRIPTION

In processes according to the invention composite materials are heated to a temperature high enough to carbonize and at least partially graphitize the materials. Examples of carbonization and graphitization processes which can be used are provided by a copending application Ser. No. 556,889, Richard J. Larsen et al, HIGH TEMPERATURE CONSOLIDATION PROCESS, filed Mar. 10, 1975 and assigned to the assignee of the present application. In the processes described in the Larsen et al application a carbon-organic resin composite is initially shaped as by molding and at least partially precured. Thereafter, the composite is placed in an electric induction furnace where it is heated at a first rate to a temperature on the order of 1000° F. (538° C.) so as to substantially decompose the resin rapidly but without delamination or other damage to the composite. Heating is then continued at a second rate until the composite undergoes substantial softening and becomes plastic, typically at a temperature in excess of 3500° F. Thereafter, the composite is maintained at a high temperature, typically in excess of 5000° F. (2760° C.) for a selected period of time while at the same time continuing the application of high pressure to provide substantial densification of the composite. The continuous process provides for the manufacture of laminated articles of substantially all carbon composition and of very high density within a relatively short period of time and without the need for successive processing steps carried out in different locations or using different pieces of equipment.

The present invention takes advantage of the convenience and improved properties provided by the methods described in copending application Ser. No. 556,889 based on the discovery that composite materials containing boron must be heated to temperatures on the order of at least about 2150° C. in order for significant improvement in the interlaminar tensile strength to occur. When the composite is first heated at temperatures up through 1000° F. to substantially decompose the resin, it is believed that voids are formed within the resin, particularly at the interfaces of the resin and carbon material such as carbon fibers or fabric. As the temperature is increased, the composite becomes plastic enabling the density to be increased with the application of pressure. The application of pressure when in a plastic state enables some of the voids to be reduced in size and other to be eliminated. However, the reknitting of the resin matrix and accompanying elimination of the voids is seldom as complete as is desired, resulting in relatively low interlaminar tensile strength for the formed part. As used herein the term "interlaminar tensile strength" refers to resistance of the composite to forces in the directions normal to the planes of the plies of the composite which tend to pull the plies apart from each other.

It has been found that with boron containing compounds such as boron carbide present in the resin matrix, the reknitting process is apparently much more complete. In any event, the interlaminar tensile strength is far superior to that which is obtainable without boron or to that obtained when boron is present but the temperature is kept below about 2150° C. As shown by the test results set forth and described hereafter boron containing compounds such as boron carbide provide some increase in the interlaminar tensile strength with the greatest improvement occurring when amorphous boron is used.

Further in accordance with the invention it has been discovered that when composite materials including boron and fibrous carbon material such as carbon or graphite cloth are heated to temperatures at least equal to or in excess of about 2150° C. so as to greatly improve the interlaminar tensile strength of the resulting product, the tensile strength in the directions of the fibers of the fibrous materials is typically reduced. This tensile strength refers to resistance of the composite to forces in the planes of the plies of the composite and extending in the directions of the orthogonally oriented and interwoven fibers of each ply which tend to break the individual fibers up along their lengths. This is thought to occur because of deterioration of the fibrous materials due to the presence of boron at high temperatures.

In accordance with the invention the fibrous carbon material is coated with a cured flexible thermosetting material prior to combination with a thermosetting resin and boron containing compound and treatment to carbonize and at least partially graphitize the composite. The coating preferably comprises a material such as a resin which is carbonizable. Furthermore, in order to work properly the material must remain reasonably flexible after cure so as to allow further impregnation with the resin boron mixture without rupture of the protective coating. Most phenolic resins are unsuitable because of their brittle nature upon curing which would prohibit further treatment and further tend to crack the protective coating. In accordance with the invention furfuryl alcohol resins have been found to work very well as the coating material. Such materials remain flexible at room temperatures after being cured. However, other carbonizable materials can be used so long as they have the requisite flexibility after cure. The cure is necessary in order that the protective coating not be penetrated by the resin boron mixture.

A group of furfuryl resins which has been found to work particularly well in accordance with the invention is disclosed in U.S. Pat. No. 3,544,530 Shaffer, FURFURYL ALCOHOL CO-POLYMERS, issued Dec. 1, 1970 and assigned to the assignee of the present application. The Shaffer patent describes furfuryl alcohol copolymers which are made by reacting maleic acid or maleic anhydride with a polyhydroxy compound such as ethylene glycol. This forms an ethylenically unsaturated, polycarboxylic acid ester prepolymer. The ester prepolymer is then copolymerized with furfuryl alcohol to produce the furfuryl alcohol copolymer. The furfuryl alcohol copolymers described in the Shaffer patent were found to be advantageous because of certain properties such as relatively low volatility, ease of storage, giving of a minimum of wafer upon curing, resistance to excessive shrinkage and a relatively short cure reaction. However, such copolymers had been found to be quite suitable for use in accordance with the present invention because of other properties, namely their ability to remain highly flexible after curing allowing the treated fabric to be impregnated without fracture of the fibers and ultimately protecting the fibers from the action of boron at the high temperatures used later in the process.

The flexible coating is applied to the fibrous carbon material and cured using an appropriate technique. One process which has been found to work well is to submerge the fibrous carbon material in an open container of the coating material, then remove excess coating material by drawing the fibrous carbon material through pressure rollers, and then dry the coating by hanging the fibrous material in air at ambient temperature to permit evaporation of a portion of the solvent in the coating material. Curing of the coating material is then accomplished such as by placing the fibrous carbon material in an air circulating oven to advance the polymerization of the resin and remove additional solvent. The solids content of the thermosetting coating material is adjusted to produce a cured coating comprising approximately 5-20% of the weight of the fibrous carbon material.

Following application of the flexible coating the fibrous carbon material is next impregnated with a thermosetting resin which is partially cured or "B" staged. The resin is combined with an appropriate amount of a boron containing compound, preferably amorphous boron. Impregnation and curing can be accomplished by appropriate methods such as submerging the fibrous carbon material in an open container of the thermosetting resin into which a desired amount of amorphous boron has been blended. The excess material is removed by drawing the fibrous carbon material between pressure rollers, after which the material is dried by hanging in air at ambient temperature to permit evaporation of a portion of the solvent contained in the resin. The dried fibrous carbon material is then treated to at least partially cure the thermosetting resin such as by placing the material in an air circulating oven to advance the polymerization of the resin. The amount of amorphous boron blended with the resin is selected so that the amorphous boron comprises approximately 2-9% of the volume of the laminate. In many instances the lower portion of this volume range, specifically 2.25-3%, is preferred. Higher percentages of boron may result in some deterioration of the fibrous carbon material despite the presence of the flexible coating.

The fibrous carbon material may comprise any carbon material which is in the form of fibers, filaments or other forms which will reduce the tensile strength of the resulting composite in the direction thereof upon deterioration and breakage or other failure. Examples include fabrics such as carbon or graphite cloth. The use of the word "carbon" herein is intended to refer to carbon in all its forms including graphite.

With the fibrous carbon material resin impregnated and the resin at least partially cured, a laminate may be formed by cutting the fibrous carbon material and stacking the resulting layers on top of one another to form a laminate. The layers may by disposed in selected orientation when particular conditions are to be met.

The resulting laminate is then preferably unified and densified with the resin matrix being further cured. In one process for accomplishing this the laminate is placed in a conforming mold in an electrically heated platen press at elevated pressure and temperature for a time sufficient to provide the laminate with a relatively high degree of fiber-resin matrix adhesion and make it adequately self-supporting for maintenance of its shape and dimension through further processing.

The laminate is then carbonized and at least partially graphitized such as by using a process described in the previously referred to Larsen et al application. Pressures on the order of 1000–2000 psi may be used in conjunction with temperatures on the order of 4000° F.

In an example carried out according to the invention graphite fabric was submerged in an open container filled with copolymers of furfuryl alcohol and maleic diethylene glycol alcohol. The solids content of the copolymers was adjusted to produce a coating comprising approximately 15% by weight of the fabric. The fabric was drawn through pressure rollers to remove excess coating and was hung in air at ambient temperature to dry. The fabric was then placed in an air circulating oven where the temperature was maintained at approximately 150° F. for approximately 1 hour, following which the temperature was raised to approximately 350° F. and maintained for approximately 2 hours. This temperature treatment thoroughly cured the coating adhering to the fabric. The cured impregnated fabric was then further impregnated by being submerged in an open container of phenol formaldehyde resin into which was thoroughly blended an amount of amorphous boron sufficient to comprise between 2–3% by volume of the composite. The fabric was drawn between pressure rollers to remove excess resin and was dried by hanging in air at ambient temperatures. Thereafter the fabric was placed in an air circulating oven at a temperature of approximately 180° F. for approximately 1 hour, following which the temperature was raised to approximately 200° F. for approximately 20 minutes. This temperature treatment advanced the resin to the "B" stage. The impregnated fabric was then cut into sections of chosen size and shape that were laid up in a desired configuration. The laminate was unified and densified and the matrix material was further cured in a conforming mold in an electrically heated platen press at approximately 1000 psi and approximately 350° F. for approximately 2 hours. The length of time required for a cure was found to be dependent on various factors including wall thickness and the shape of the part. When removed from the press the part had a high degree of fiber-matrix adhesion. The part was adequately self-supporting for maintenance of its shape and dimension through further processing steps. The laminate was then fully carbonized, further compacted and carried to a graphitic state while under pressure of 1000–2000 psi in equipment capable of being heated at temperatures of approximately 4000° F. by electrical induction heating. This step completed the conversion of the resin matrix and advanced graphite crystallinity. The interlaminar tensile strength and tensile strength in the directions of the fibers of two different samples made according to this example were determined to be as follows:

|  | Sample 1 | Sample 2 |
|---|---|---|
| Tensile strength in the directions of the fibers (psi) | 10035 | 6800 |
| Interlaminar tensile strength (psi) | 727 | 1191 |
| Composition (Percent by volume) |  |  |
| Fabric | 49.45 | 40.42 |
| Resin | 48.26 | 56.61 |
| Boron | 2.29 | 2.97 |

The process described in the above example was repeated for three different samples except that the fabric was not coated with the flexible thermosetting compound. Tests conducted on the three different samples showed the following results:

|  | Sample 1 | Sample 2 | Sample 3 |
|---|---|---|---|
| Tensile strength (psi) in the directions of the fibers | 3353 | 2257 | 2201 |
| Interlaminar tensile strength (psi) | 1902 | 1636 | 1879 |
| Composition (Percent by volume) |  |  |  |
| Fabric | 44.76 | 53.00 | 47.02 |
| Resin | 50.54 | 45.00 | 47.57 |
| Boron | 4.69 | 2.00 | 5.41 |

It will be seen that in the case where the flexible coating is used on the fibers the interlaminar tensile strength was somewhat less than in the case where the coating is not used, although certainly at acceptable levels. On the other hand, the tensile strength in the directions of the fibers proved to be 3 to 4 times greater in the case where the fiber coating is used.

The process described in the above example was again repeated without the fabric being coated and using boron carbide instead of amorphous boron. A single sample was made and the results are as follows:

|  | Sample 1 |
|---|---|
| Tensile strength (psi) in the directions of the fibers | 4064 |
| Interlaminar tensile strength (psi) | 406 |
| Composition (Percent by volume) |  |
| Fabric | 45.48 |
| Resin | 49.14 |
| Boron Carbide | 5.38 |

It will be observed that boron carbide was not nearly as effective as amorphous boron in improving the interlaminar tensile strength of the composite. Moreover, in the absence of the flexible coating on the fabric the tensile strength in the directions of the fibers decreased to a value considerably smaller than that obtained by using the protective coating on the fabric.

The process described in the above example was repeated except that the fabric was not coated and no boron in any form was added. Two different samples produced the following results:

|  | Sample 1 | Sample 2 |
|---|---|---|
| Tensile strength (psi) in the directions of the fibers | 9000 | 11000 |
| Interlaminar tensile strength (psi) | 200 | 350 |
| Composition (Percent by volume) |  |  |
| Fabric | 44.72 | 44.72 |
| Resin | 42.57 | 42.57 |
| Carbon filler | 12.71 | 12.71 |

It will be seen that in this example the tensile strength in the directions of the fibers was relatively high, but the interlaminar tensile strength was quite low.

What is claimed is:

1. A method of making a carbon-carbon composite comprising the steps of:
    providing a fabric of carbon material which is free of boron;
    applying a coating of a flexible thermosetting resin which is free of boron and which remains flexible upon curing to the fabric;
    curing the flexible thermosetting resin;
    impregnating the fabric with a second thermosetting resin;
    adding a selected amount of boron to the second thermosetting resin in conjunction with impregnation of the fabric with the second thermosetting resin;
    at least partially curing and second thermosetting resin;
    assembling a plurality of layers of the fabric to form a laminate;
    treating the laminate to further cure the second thermosetting resin; and
    heating the laminate to at least about 4000° F. in an inert atmosphere while simultaneously applying pressure to the laminate to carbonize and at least partially graphitize the flexible thermosetting resin and the second thermosetting resin.

2. The method set forth in claim 1, wherein the flexible thermosetting resin consists of furfuryl alcohol copolymers and the coating comprises 5-20% of the weight of the coated fabric.

3. The method set forth in claim 2, wherein the step of coating the fabric comprises submerging the fabric in the furfuryl alcohol copolymers, drawing the fabric through pressure rollers and hanging the fabric in air at ambient temperature to dry.

4. The method set forth in claim 2, wherein the step of curing the flexible thermosetting resin comprises maintaining the coated fabric in an air circulating oven at approximately 350° F. for approximately 2 hours.

5. The method set forth in claim 1, wherein the boron consists of amorphous boron and comprises 2-9% of the volume of the laminate.

6. The method set forth in claim 1, wherein the steps of impregnating the fabric with a second thermosetting resin and adding a selected amount of boron to the second thermosetting resin together comprise blending the selected amount of the boron into the second thermosetting resin, submerging the fabric in the second thermosetting resin, drawing the fabric through pressure rollers and hanging the fabric in air at ambient temperature to dry.

7. The method set forth in claim 1, wherein the second thermosetting resin comprises a phenolic resin and the step of curing the second thermosetting resin comprises maintaining the impregnated fabric in an air circulating oven at approximately 180° F. for approximately 1 hour and thereafter maintaining the impregnated fabric in an air circulating oven at approximately 200° F. for approximately 20 minutes.

8. The method set forth in claim 7, wherein the step of treating the laminate to further cure the second thermosetting resin comprises maintaining the laminate in a conforming mold at approximately 1000 psi and approximately 350° F. for approximately 2 hours.

9. The method set forth in claim 1, wherein the step of heating the laminate while simultaneously applying pressure to carbonize and at least partially graphitize the flexible thermosetting resin and the second thermosetting resin includes applying a pressure of 1000-2000 psi to the laminate.

10. A method of making carbon-carbon composite comprising the steps of:
    providing fibrous carbon material which is free of boron;
    applying a coating of a flexible thermosetting resin which is free of boron and which remains flexible upon curing to the fibrous carbon material;
    curing the flexible thermosetting resin;
    impregnating the fibrous carbon material with boron and an at least partially cured second thermosetting resin;
    assembling a plurality of layers of the material to form a laminate; and
    heating the laminate to at least about 4000° F. in an inert atmosphere while simultaneously applying pressure to the laminate to carbonize and at least partially graphitize the second thermosetting resin.

11. The method set forth in claim 10, wherein the fibrous carbon material comprises graphite cloth, the flexible thermosetting resin comprises furfuryl alcohol resin and the boron comprises amorphous boron.

12. In a process in which layers of carbon material are combined with a thermosetting resin, assembled into a laminate and heated to carbonize and at least partially graphitize the resin and form a carbon-carbon composite, the improvement comprising coating the carbon material which is free of boron with a flexible thermosetting resin which is free of boron and curing the flexible thermosetting resin prior to combination with the first-mentioned thermosetting resin and adding boron to the first-mentioned thermosetting resin prior to assembling into a laminate and carbonizing and at least partially graphitizing the first-mentioned resin by heating to a temperature of at least about 4000° F. at an elevated pressure.

13. The invention set forth in claim 12, wherein the flexible thermosetting resin is comprised of furfuryl alcohol copolymers.

* * * * *

UNITED STATES PATENT AND TRADEMARK OFFICE
CERTIFICATE OF CORRECTION

PATENT NO. : 4,101,354
DATED : July 18, 1978
INVENTOR(S) : Robert C. Shaffer

It is certified that error appears in the above-identified patent and that said Letters Patent are hereby corrected as shown below:

Column 1, line 57, "BREIF" should read --BRIEF--. Column 2, line 65, "other" should read --others--. Column 3, line 3, after "in" and before "directions" strike "the". Column 4, line 2, after "giving" and before "of" insert --off--; line 2, "wafer" should read --water--; line 65, after "may", "by" should read --be--. Column 7, line 19, after "curing", "and" should read --the--. Column 8, line 18, after "making" and before "carbon-carbon", insert --a--.

Signed and Sealed this

Second Day of January 1979

[SEAL]

Attest:

RUTH C. MASON
Attesting Officer

DONALD W. BANNER
Commissioner of Patents and Trademarks